United States Patent
Pickering

[11] 3,790,246
[45] Feb. 5, 1974

[54] X-Y OPTICAL SCANNING SYSTEM

[75] Inventor: Royce Dean Pickering, Rochester, N.Y.

[73] Assignee: Eastman Kodak Company, Rochester, N.Y.

[22] Filed: Oct. 26, 1971

[21] Appl. No.: 192,452

[52] U.S. Cl.............. 350/7, 350/285, 350/294, 178/7.6
[51] Int. Cl. .................................... G02b 17/00
[58] Field of Search... 350/6, 7, 285, 293, 294, 169, 350/84, 85, 100; 178/7.6

[56] References Cited
UNITED STATES PATENTS

| | | | |
|---|---|---|---|
| 3,647,956 | 3/1972 | Buck | 350/7 |
| 3,669,522 | 6/1972 | Anderson | 350/6 |
| 3,520,586 | 7/1970 | Bousky | 350/6 |
| 3,447,852 | 6/1969 | Barlow | 178/7.6 |
| 3,448,458 | 6/1969 | Carlson et al. | 350/6 |
| 2,971,695 | 2/1961 | Sick | 350/285 |

*Primary Examiner*—Ronald L. Wibert
*Assistant Examiner*—Michael J. Tokar

[57] ABSTRACT

A system for X-Y scanning and recording on a light responsive storage medium. The system comprises a suitably modulated light source, a first rotating deflecting element, for example, a flat faceted mirror wheel, and a second rotating deflecting element, for example, a flat or concave mirror. The axes of rotation of the two rotating deflecting elements are substantially mutually perpendicular. Alternatively the axes of rotation can be at another chosen angle to one another. Operatively disposed along the optical axis between the first and second rotating deflecting elements is a first field mirror which is preferably of the concave spherical type. Operatively disposed between the second rotating deflecting element and the recording medium is a second field mirror which is also preferably concave spherical. The concave mirrors serve to image both scanning mirrors at the entrance pupil of a final lens. This arrangement allows all of the incident light to pass through the final lens. Small mirror faces can be used and a small stationary beam such as from a laser is easily scanned. An image which is essentially free of distortion and curvature of field can be obtained on a flat storage medium.

9 Claims, 3 Drawing Figures

ROYCE D. PICKERING
INVENTOR.

BY Robert W. Weig

ATTORNEY

ROYCE D. PICKERING
INVENTOR.

BY Robert W. Weig
ATTORNEY

X-Y OPTICAL SCANNING SYSTEM

FIELD OF THE INVENTION

This invention relates to optical scanning systems and more particularly to low distortion X-Y optical scanning systems which utilize small mirrors and pass all available light through a final lens to record an image on a light sensitive storage medium.

BACKGROUND OF THE INVENTION

It is well known that photographic materials may be used to record information in the form of either images or suitably coded data. Photographic material are also known to be well suited to the recording of large amounts of information in a relatively small storage area. Thus, devices such as those disclosed in U.S. Pat. Nos. 3,469,030 to Priebe and 3,520,586 to Bousky provide for information to be transduced from electrical signals into visible records.

If images of extremely high resolution are to be recorded, optical scanning means represent the highest quality technique presently known. Most optical scanning systems make use of some form of rotating optical element. If high frequency electrical signals are to be recorded, high rotational speed is typically required. For high rotational speeds, it is very advantageous for the rotating elements to be as small as possible since the smaller the rotating element, the easier it is to control. The novel system of the invention utilizes very small rotating elements capable of high rotational speeds and good synchronization. Too, for high resolution images to be accurately and effectually recorded, high resolution, quality recording mediums need be used. Generally available, high resolution, quality recording mediums have relatively low sensitivity to recording radiation. Therefore, due to this low sensitivity in quality recording mediums, an optical system for high resolution recording should very efficiently use available exposing radiation.

Lasers are particularly attractive as exposing radiation sources for recording on mediums of low sensitivity because laser beams can easily be focused to small spots in which the energy density is extremely high. Therefore, a scanning system is disclosed that efficiently uses available exposing radiation sources for recording high frequency signals on high resolution, quality recording mediums. The system of the invention utilizes a laser beam for recording in a novel and efficient manner.

Another useful feature for pictorial imaging systems, e.g., video recording, and some data recording systems e.g., computer output microfilming, is the capability of recording frame-by-frame on a recording medium which is held intermittently for recording. A system could be simpler and faster with less danger of damage to the recording medium if the area to be exposed of the recording medium can be in a flat position at time of exposure. Typical prior art recording systems such as that described by U.S. Pat. Nos. 3,469,030 and 3,520,586 have found it necessary to record with the area exposed positioned on a curved recording surface. Since the ordinary recording medium such as microfilm is a flat tape or strip wound as reels or in microfiche form, such deformation generally slows the system down and/or can lead to damage of the medium in handling and deforming. The system of the invention utilizes a novel combination of optical elements selectively located with reference to one another to achieve relatively distortion free recording on a flat medium. Too, by selecting the appropriate elements, selected distortion can be novelly introduced into the system of the invention to report the recorded image.

The X-Y scanning system of the instant invention provides for the light radiation from a suitably modulated source beam having a small cross section to novelly pass through and be processed completely by the system and to be novelly imaged on a flat area of a recording medium which maximizes speed and minimizes the possibility of damage to the medium. Too, a laser light source is preferably used to provide relatively intense exposing radiation which provides for high recording speed. In addition, small rotating elements can be used which are suited for high rotation speeds due to selective placement thereof within the system of the invention. Thus, information from high frequency electrical signals can be recorded with minimal loads on the mechanical drives for the rotating elements.

One object of the present invention is to provide a relatively distortion free X-Y optical scanning system.

Another object of the scanning system of the present invention is to provide an economical and simple low distortion X-Y scanning system capable of multiple scan lines.

Yet another object of the invention is to provide a system for recording on a flat storage high resolution medium by efficiently using available light.

Still another object of the present invention is to provide an X-Y scanning system with variable distortion in the Y direction.

Yet another object of the present invention is to provide an X-Y scanning system utilizing optical elements of relatively small size which are novelly located with reference to one another to efficiently use all available scanning light.

One advantage of the scanning system of the present invention is that the component parts thereof are relatively simple, inexpensive to acquire, and the invention is easily constructed therefrom.

Another advantage of the scanning system of the present invention is that a relatively trouble-free scanning system which is easily aligned is provided thereby.

Yet another advantage of the invention is that minimal size components can be used which efficiently utilize a maximum amount of available light for scanning due to their novel relative locations and to the relative relationship of their optical parameters.

Still another advantage of the invention is that high speed low distortion scanning is achieved with the system thereof since flat recording surfaces can be used in accordance therewith.

In accordance with the invention, there is provided an X-Y optical scanning system for recording a substantially distortion free image on a light sensitive storage medium with a suitable modulated light beam: along the optical axis there are provided a first rotating deflecting element, a second rotating deflecting element having an axis of rotation perpendicular to or at another selected angle relative to the axis of rotation of the first deflecting element; first and second reflective elements, preferably spherical concave mirrors, the first reflective element operatively disposed between the first rotating deflecting element and the second rotating deflecting element, the second reflective element operatively disposed between the second rotating deflecting element and an image plane in which a preferably flat, light sensitive recording medium is positioned.

BRIEF DESCRIPTION OF THE DRAWINGS

Reference is now made to the drawings in which like characters denote like parts and wherein:

Referring now to FIG. 1, light beam 10 from a light source (not shown) which is preferably a laser but can be any source, and which is suitably modulated in order to, by scanning, record an image, is made to pass through a beam converging element such as spherical lens 12. From lens 12, the beam 10 passes onto a first rotating deflecting element 14, which is preferably a rotating mirror wheel having flat facets but which can also be rotable flat mirror, prism or other such element. The axis of rotation 20 of element 14 lies within the plane of the paper. Light from beam 10 is deflected by rotating deflecting element 14 in an X scanning arc which lies in a plane perpendicular to the plane of the paper and along path A to form a real image at $O_1'$, which lies on concentric focal surface 15 of first concave field mirror 16 which is preferably spherical concave and which is in a relatively stationary position. The focal length of lens 12 is chosen so that some light in path A focuses to an image $O_1'$ on focal surface 15. The light from beam 10 within path A is reflected and collimated by field mirror 16 along path B as parallel rays onto a second rotating deflecting element 18 which is preferably a rotating flat mirror having an axis of rotation 21 perpendicular to the axis of rotation 20 of first deflecting element 14. As mentioned above, the axis of rotation 20 of first deflecting element 14 within the plane of the paper whereas the axis of rotation 21 of element 18 as shown in the drawing, is preferably perpendicular to the plane of the paper and axis 20. It will be appreciated by those skilled in the art that the perpendicularity of the two axes of rotation is to facilitate conventional X-Y scanning. If however, modified X-Y scanning is desired, the relative angular positions of the axes of rotation 20 and 21 can be changed from the relative perpendicularity thereof to any chosen angle in accordance with the needs of the particular application.

Figure 1:
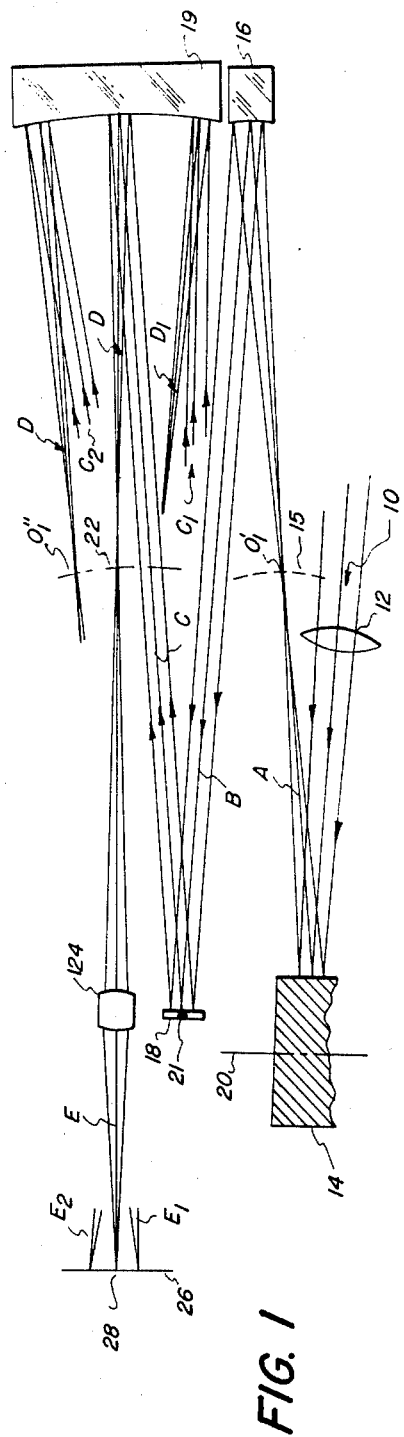
FIG. 1 schematically shows an optical scanning system in accordance with a preferred embodiment of the invention.

Rotating deflecting element 18 gives Y scanning motion to beam 10. Parallel light rays within path C are deflected to the second reflecting element, concave field mirror 19. The Y range of the scanning beam 10 within path C is indicated by extreme beams $C_1$ and $C_2$. The X range of scan, it will be appreciated, is perpendicular to the plane of the paper and therefore not indicated for purposes of clarity. Second field mirror 19 reflects and converges beam 10 from within path C along path D within scan range $D_1$ to $D_2$. Beam 10 within path D converges to a real image $O_1''$ on the focal surface 22 of field mirror 19. From there the light passes through lens 24, the object surface of lens 24 being in common with the focal surface 22 of field mirror 19.

Lens 24 focuses beam 10 within path E to an image at the plane 26 containing a preferably flat, light sensitive or light responsive recording medium 28. A lens which will satisfactorily function as lens 24 is the 22mm Rotoline Microfilmer lens KAD part No. 625180 manufactured by the Eastman Kodak Company of Rochester, New York. Other such lenses are readily available and well known to those skilled in the art. Too, lens 24 can also be one adapted to scan whatever type of surface the recording medium presents, e.g., flat, cylindrical or spherical. The recording medium 28 can be photographic film, light-responsive paper or other such light responsive mediums. Extreme beams $E_1$ and $E_2$ indicate the Y scan range of path E. Since the mirror surfaces of deflecting elements 14 and 18 and the entrance pupil of lens 24 are at the center of curvature of mirrors 16 and 19, the mirror facets and the entrance pupil of the lens 24 contain stationary images of each other. This novelly allows for the use of small mirror faces. As a result of this novel arrangement in accordance with the invention, all the light transmitted by the system passes through lens 24. It will be appreciated that first deflecting element 14, second deflecting element 18 and lens 24 are novelly disposed substantially at the centers of curvature of spherical field mirrors 16 and 19. This arrangement which is in accordance with the invention provides for the use of relatively small mirror faces on both deflecting elements 14 and 18. Too, lens 24 is chosen so that the curved object plane 22 of field mirror 19 is imaged on plane 26.

Figure 2:
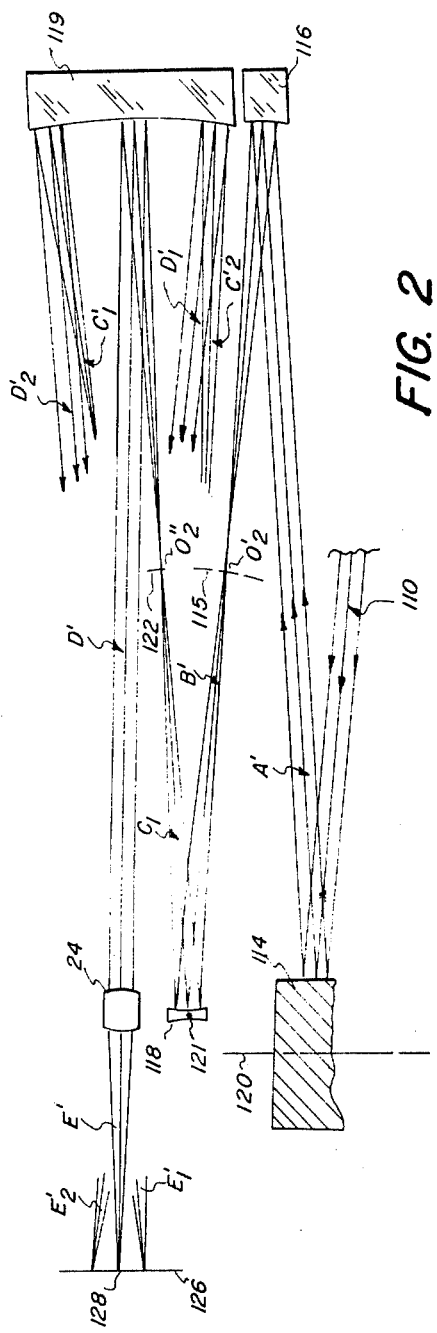
FIG. 2 schematically shows an alternative embodiment of the present invention.

Reference if now made to FIG. 2 wherein another embodiment of the X-Y scanner in accordance with the invention is shown. Parallel light rays in the modulated collimated beam 110 are deflected from first rotating deflecting element 114 having an axis of rotation 120. Element 110 is preferably the same type of deflecting element as that set forth as element 14 with reference to FIG. 1. From element 114 the light within beam 110 is deflected in an X scanning arc along path A' with the direction of scan being perpendicular to the paper. The light beam 110 within path A' impinges upon first field mirror 116 which is preferably spherical concave to reflect light beam 110 along path B'. Light beam 110 in path B' converges to an image $O_2'$ which lies on focal surface 115 of mirror 116. The light then continues along path B' to a second rotating deflecting element 118 which rotates about an axis of rotation 121 perpendicular to the axis of rotation 120 of the first deflecting element 114. Rotating deflecting element 118 is a concave spherical mirror, preferably, with a radius of concavity substantially equal to 1/2 that of field mirrors 116 and 119, the latter two mirrors having, preferably, substantially equal radii of curvature. Light from beam 110 is deflected by element 118 and given Y scanning motion thereby along path C' within the range defined by extreme beams $C_1'$ and $C_2'$. X scanning ranges which are those perpendicular to the plane of the paper are not shown for purposes of clarity. A real image is produced at $O_2''$ within the focal surface 122 of the field mirror 119 within path C'. Beam 110 is then reflected as parallel rays from field mirror 119 along path D' within a Y range defined by beams $D_1'$ and $D_2'$ to pass through lens 124 which images the beam 110, transmitted along path E' within the X range defined by exteme beams $E_1'$ and $E_2'$, at focal plane 126 containing a light sensitive recording medium 128. In this system, variable astigmatism is novelly created by changing the incident angle of the light beam 110 within path B' impinging on concave rotating deflecting element 118. Rotating deflecting elements 114 and 118 in accordance with the invention are located substantially at the center of curvature of spherical field mirrors 116 and 119. Such a novel disposition allows relatively small mirror faces to be used on deflecting elements 114 and 118. Lens 124 is a typical high quality camera lens which has the property of imaging an object at a great distance onto a flat image plane. Alternatively, if a curved imaged surface is used, lens 124 is chosen to be suitable for recording a low distortion image thereon.

Figure 3:
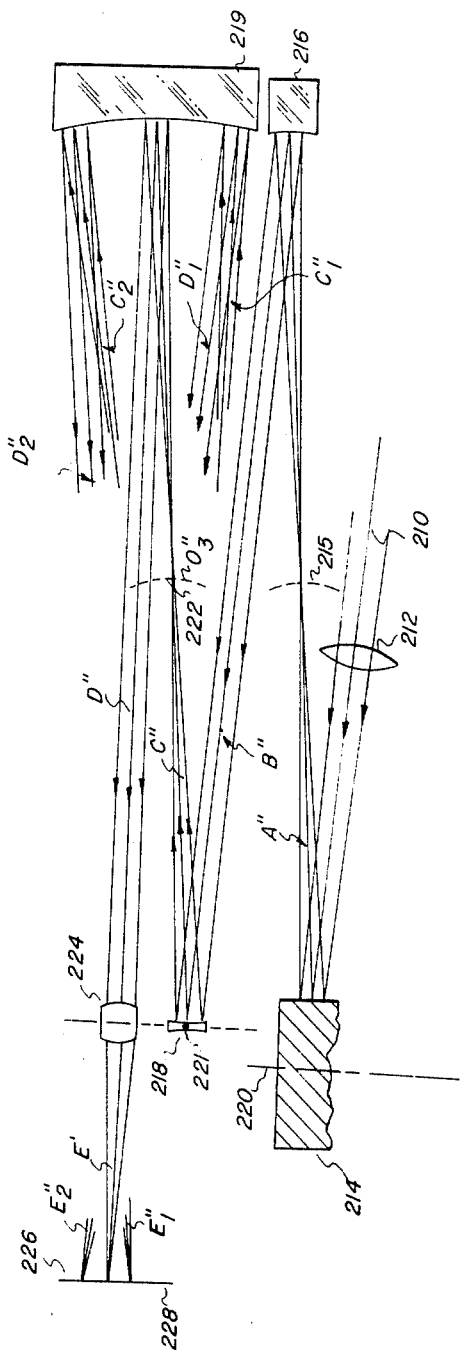
FIG. 3 schematically shows another alternative embodiment of the low distortion scanning system of the invention.

With reference to FIG. 3, an embodiment of a system in accordance with the present invention is shown in which optical paths A'' and B'' are similar to paths A and B of FIG. 1. Collimated modulated light beam 210 is converged by lens 212 to impinge upon first rotating deflecting element 214 which deflects the light from beam 210 and imparts an X scanning motion to it, directing it along path A''. A real image $O_3''$ is formed which lies on the focal surface 215 of preferably spherical concave first field mirror 216 which reflects the light beam from path A'' along path B'' to second rotating deflecting element 218. Deflecting elements 214 and 218 rotate about axes 220 and 221, respectively, which are preferably substantially mutually perpendicular, but which may be selected to be at any chosen angle to one another to modify the preferred X-Y scan. The radius of curvature of the spherical concave rotating mirror 218 is substantially equal to the common radii of curvature of field mirrors 216 and 219 such that a real image $O_3''$ is produced. $O_3''$ lies on the focal surface 222 of spherical concave field mirror 219 located within path C''. Y scanning motion within path C'' is derived from rotating mirror 218 and is transmitted within the range of $C_1''$ to $C_2''$. The X direction of scan range is not shown for purposes of clarity, but is in direction perpendicular to the plane of the paper. The X-Y scanning beam 218 within path C'' is reflected and collimated by concave field mirror 219 along path D'' within the Y scan range of $D_1''$ to $D_2''$ and within an X range not shown but perpendicular to the plane of the paper. The collimated light beam 210 in path D'' passes through lens 224 which transmits it along path E'' within range $E_1''$ to $E_2''$ and focuses it to an image at plane 226, containing the recording medium 228. The variable astigmatism produced by the changing angle of incidence on mirror 218 is less than for the mirror 118 of FIG. 2 due to the lower numerical aperture of mirror 218, i.e., the radius of curvature of mirror 218 of FIG. 3 is equal to the common radius of curvature of field mirrors 216 and 219 whereas the radius of curvature of mirror 118 of FIG. 2 is approximately one-half the common radius of curvature of field mirrors 116 and 119.

A particular advantage in practicing the invention is that in all the above mentioned embodiments, light passing through the entrance pupil of lens 24, 124 or 224 also novelly passes through the image of that pupil at the corresponding mirrors 14, 18; 114, 118; 214, and 218 respectively. Due to the radii of curvature novelly chosen for mirrors 16, 116; 216, 19; 119, and 219 and the novel positioning of the several elements of the system, small mirrors can be used, and a small size stationary beam such as from a laser source can be scanned. Adjustments to the relative positions of the scanning mirrors and the image of the aperture of lens 24, 124 or 224 can be made to accomodate various input optical systems.

The invention has been described in detail with particular reference to preferred embodiments thereof, but it will be understood that variations and modifications can be effected within the spirit and scope of the invention.

I claim:

1. An X-Y optical scanning device for recording a low distortion image on a light-responsive medium with a modulated light beam, said device comprising:
   first means rotatable about a first axis and operatively disposed in the path of said light beam for deflecting the same to produce a first deflection beam scanning in one direction;
   second means rotatable in synchronism with said first means about a second axis that is angularly disposed relative to the first axis and operatively disposed in the optical path of said first deflection beam for deflecting the same to produce a second deflection beam scanning in an other direction; and
   means operatively disposed in the optical path of each of said first and second deflection beams for imaging the latter onto said medium.

2. The invention of claim 1 wherein said imaging means comprises two fixed spherical, concave mirrors and an objective lens, one of said mirrors being operatively disposed in the path of said first deflection beam between said first rotatable means and said second rotatable means and said other mirror and said objective lens being operatively disposed in the path of said second deflection beam between said second rotatable means and said medium.

3. The invention of claim 1 wherein at least one of said first and second rotatable means comprises a reflective element having at least one flat reflective surface.

4. The invention of claim 1 wherein said second rotatable means comprises a rotating spherical, concave mirror.

5. The invention of claim 2 wherein each of said fixed mirrors have substantially the same radius of curvature.

6. The invention of claim 2 wherein said second rotatable means comprises a spherical, concave mirror having a radius of curvature that is approximately one-half of the radius of curvature common to said fixed mirrors.

7. An X-Y optical scanner for recording a low distortion image on a light responsive medium with a modulated light beam, said device comprising:
   first optical means disposed in the path of said beam for imaging the latter at a predetermined point;
   first reflective means rotatable about an axis located between said first optical means and said point for reflecting and deflecting said imaging beam to produce a scan in a first direction;
   second inflective means having a spherical, concave radius of curvature, operatively disposed in the path of said deflecting beam at a distance from said first reflective means approximately equal to said radius of curvature and located such that said point lies generally in the focal plane thereof, for reflecting and collimating said deflecting beam;
   third reflective means rotatable about an axis substantially perpendicular to the axis of rotation of said first reflective means, operatively disposed in the path of said collimating beam and located at a distance from said second reflective means that is substantially equal to the radius of curvature thereof, for reflecting and deflecting said collimating beam to produce a scan in a second direction which is substantially perpendicular to the scan in said first direction;

fourth reflective means having a spherical, concave radius of curvature approximately equal to that of said second reflective means and operatively disposed in the path of said deflecting beam at a distance from said third reflective means that is substantially equal to the radius of curvature of said second reflective means, for reflecting and focusing said deflecting beam into the focal plane thereof; and second optical located in the path of said focusing beam at a distance approximately equal to the radius of curvature of said fourth reflective means for imaging said focusing beam at a point in the plane of said medium.

8. An X-Y optical scanner for recording a low distortion image on a light responsive medium with a modulated, collimated light beam, said device comprising:

first reflective means rotatable about an axis located in the path of said beam for reflecting and deflecting said collimated beam to produce a scan in a first direction;

second reflective means having a spherical, concave radius of curvature and operatively disposed in the path of said collimated beam at a distance from said first reflective means approximately equal to said radius of curvature for reflecting and focusing said collimated beam generally in the focal plane thereof;

third reflective means having a spherical, concave radius of curvature approximately equal to one-half the radius of curvature of said second reflective means, rotatable about an axis substantially perpendicular to that of said first reflective means, operatively disposed in the path of said focusing beam at a distance substantially equal to the radius of curvature of said second reflective means away from said second reflective means for reflecting and deflecting said focusing beam to produce a scan in a second direction which is substantially perpendicular to the scan in said first direction;

fourth reflective means having a spherical, concave radius of curvature approximately equal to that of said second reflective means and operatively disposed in the path of said deflecting beam at a distance that is substantially equal to the radius of curvature of said second reflective means for reflecting and collimating said deflecting beam; and optical means located in the path of said collimating beam at a distance approximately equal to the common radius of curvature of said second and fourth reflective means, for imaging said collimated beam at a point in the plane of said medium.

9. An X-Y optical scanner for recording a low distortion image on a light responsive medium with a modulated, collimated light beam, said device comprising:

first optical means disposed in the path of said beam for imaging the latter at a predetermined point;

first reflective means rotatable about an axis located between said first optical means and said point for reflecting and deflecting said imaging beam to produce a scan in a first direction;

second reflective means having a spherical, concave radius of curvature and operatively disposed in the path of said deflecting beam at a distance from said first reflective means approximately equal to the radius of curvature thereof for reflecting and collimating said deflecting beam;

third reflective means rotatable about an axis substantially perpendicular to the axis of rotation of said first reflective means, having a radius of curvature substantially equal to the radius of curvature of said second reflective means, operatively disposed in the path of said collimating beam and located at a distance from said second reflective means substantially equal to its radius of curvature for reflecting and deflecting said collimating beam to produce a scan in a second direction which is substantially perpendicular to the scan in said first direction;

fourth reflective means having a spherical, concave radius of curvature approximately equal to that of said second reflective means and operatively disposed in the path of said deflecting beam at a distance from said third reflective means that is substantially equal to the common radius of curvature of said second and third reflective means, for reflecting and collimating said deflecting beam; and second optical means located in the path of said collimating beam at a distance approximately equal to the radius of curvature of said fourth reflective means for imaging said collimating beam at a point in the plane of said medium.

* * * * *